(12) United States Patent
Parke et al.

(10) Patent No.: US 8,840,484 B2
(45) Date of Patent: Sep. 23, 2014

(54) APPARATUS FOR PROVIDING MOTION SENSORS ON A GOLF CLUB

(71) Applicant: Skyhawke Technologies, LLC., Ridgeland, MS (US)

(72) Inventors: Gordon Parke, Winnipeg (CA); Adam Tsouras, Winnipeg (CA); Travis Titus, Minneapolis, MN (US)

(73) Assignee: Skyhawke Technologies, LLC., Ridgeland, MS (US)

(*) Notice: Subject to any disclaimer, the term of this patent is extended or adjusted under 35 U.S.C. 154(b) by 0 days.

(21) Appl. No.: 13/744,300

(22) Filed: Jan. 17, 2013

(65) Prior Publication Data
US 2014/0200093 A1 Jul. 17, 2014

(51) Int. Cl.
A63B 69/36 (2006.01)

(52) U.S. Cl.
CPC .................. *A63B 69/3658* (2013.01)
USPC ............. 473/223; 473/221; 473/224

(58) Field of Classification Search
USPC ......... 473/219–224, 226, 231–234, 238, 242, 473/244–246, 257, 258, 266
See application file for complete search history.

(56) References Cited

U.S. PATENT DOCUMENTS

| | | | |
|---|---|---|---|
| 4,789,160 A * | 12/1988 | Dollar et al. | 473/223 |
| 5,342,054 A | 8/1994 | Chang et al. | |
| 5,911,635 A * | 6/1999 | Ogden | 473/224 |
| 6,033,370 A | 3/2000 | Reinbold et al. | |
| 6,450,893 B1 * | 9/2002 | Primiano et al. | 473/220 |
| 6,468,166 B1 * | 10/2002 | Spitzer | 473/241 |
| 6,607,450 B1 * | 8/2003 | Hackman | 473/223 |
| 7,021,140 B2 * | 4/2006 | Perkins | 73/493 |
| 7,219,033 B2 | 5/2007 | Kolen | |
| 2003/0207718 A1 * | 11/2003 | Perlmutter | 473/221 |
| 2005/0054457 A1 | 3/2005 | Eyestone et al. | |
| 2007/0135225 A1 | 6/2007 | Nieminen et al. | |
| 2009/0247312 A1 * | 10/2009 | Sato et al. | 473/223 |
| 2011/0224012 A1 | 9/2011 | Hashimoto et al. | |
| 2012/0289354 A1 * | 11/2012 | Cottam et al. | 473/223 |

FOREIGN PATENT DOCUMENTS

| | | |
|---|---|---|
| CA | 2 560 023 | 10/2005 |
| CA | 2 595 793 | 8/2006 |

OTHER PUBLICATIONS

"I got my Swingbyte! What do I do?: Swingbyte", https://swingbyte.zendesk.com/entries/21433803-i-got-my-swingbyte-what-do-i-do.
"Mobile golf swing analysis on your phone or tablet I Swingbyte", http://www.swingbyte.com/how_it_works.
US Office Action issued in U.S. Appl. No. 13/005,163, filed Jan. 12, 2011.

* cited by examiner

*Primary Examiner* — Nini Legesse
(74) *Attorney, Agent, or Firm* — Oblon, Spivak, McClelland, Maier & Neustadt, L.L.P.

(57) ABSTRACT

A fixed clamping member has a first interior surface and is constructed of a first material. A sensor unit formed on an exterior surface of the fixed clamping member detects a motion of the motion analysis device. A pivoting clamping member secured to a first end of the fixed clamping member has a second interior surface that opposes the first interior surface when the pivoting clamping member is in a secured position. A gripping element constructed of a second material different than the first material is formed over the first interior surface and the second interior surface. A tightening member having a threaded portion is secured to a second end of the fixed clamping member. A knob has a threaded interior portion with a diameter corresponding to the cylindrical threaded portion. An opening on the pivoting clamping member has a shape and a size corresponding to the tightening member.

20 Claims, 8 Drawing Sheets

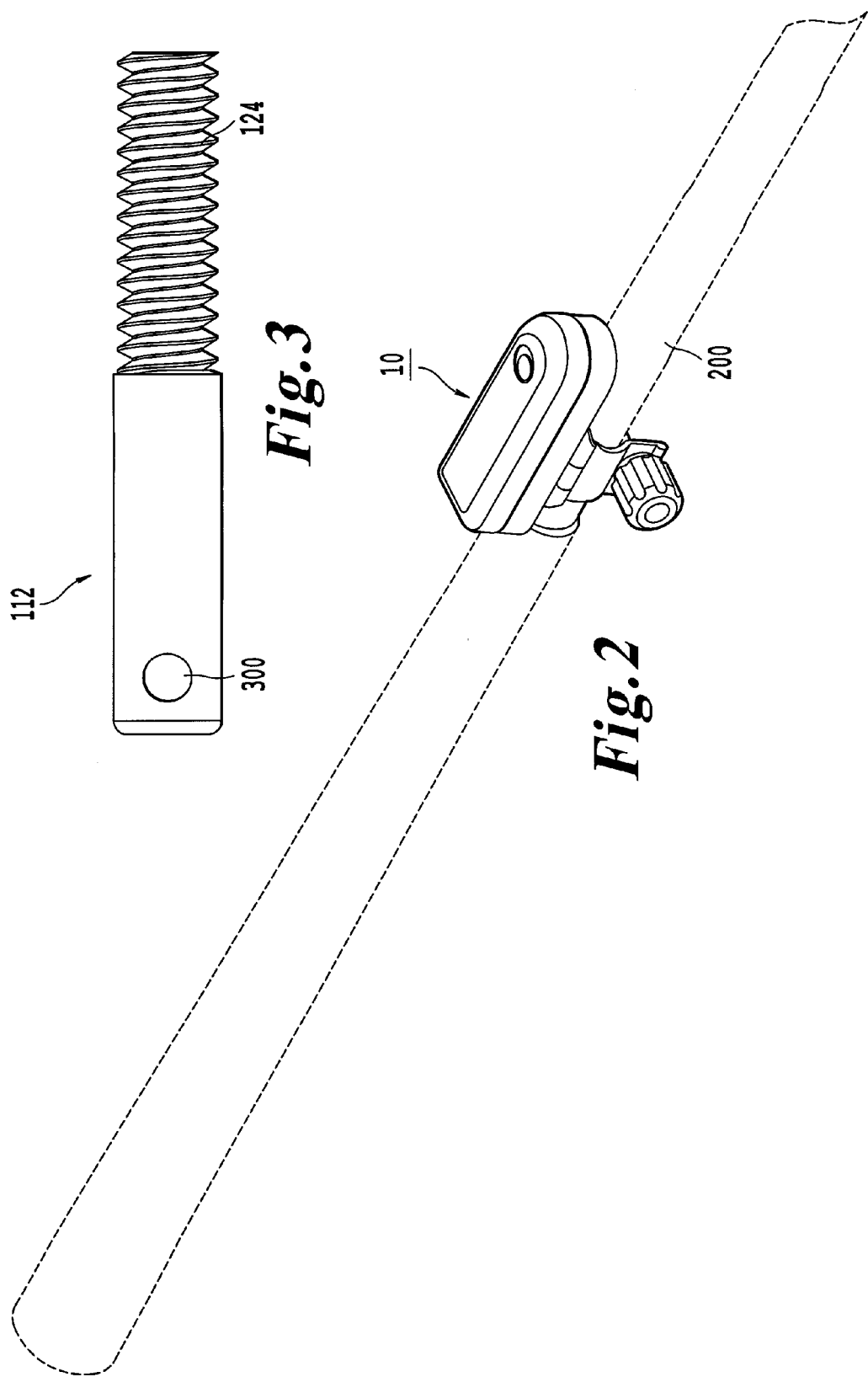

APPARATUS FOR PROVIDING MOTION SENSORS ON A GOLF CLUB

CROSS-REFERENCE TO RELATED APPLICATIONS

This application relates to and incorporates by reference the disclosures of U.S. patent application Ser. No. 13/744,294, filed Jan. 17, 2013, and U.S. patent application Ser. No. 13/744,308, filed Jan. 17, 2013.

BACKGROUND

1. Field of the Disclosure

The present disclosure relates to a motion analysis device and corresponding clamping mechanism for sensing motion.

2. Description of the Related Art

In an effort to improve performance, golfers often seek instruction and feedback on golf swing technique. For example, a swing coach may evaluate a golfer's swing motion during a lesson, and provide critique based on ideal characteristics of a swing. Additionally, devices that optically track the motion of a golf club during a golf swing are used, e.g., when fitting a golfer for custom clubs. Further, products are available that attach to the golf club and measure motion for swing analysis.

Accuracy is of high importance if motion sensors attached to a golf club are to be used in swing analysis. In this case, any movement of the motion sensor relative to the golf club during the swing introduces inaccuracies into the swing analysis, thereby decreasing the reliability of such analyses. Previous shaft-mounted motion sensing devices incorporate arrangements and materials that may not adequately withstand the forces generated during a golf swing, which may consequently result in material failure and unwanted sensor movements.

SUMMARY

Among other things, the present disclosure describes a motion analysis device. The motion analysis device can include a fixed clamping member having a first interior surface, and being constructed of a first material. The motion analysis device can include a sensor unit integrally formed on an exterior surface of the fixed clamping member, the sensor unit being configured to detect a motion of the motion analysis device. A pivoting clamping member can be pivotally secured to a first end of the fixed clamping member, and the pivoting clamping member can have a second interior surface that opposes the first interior surface of the fixed clamping member when the pivoting clamping member is in a secured position. A gripping element can be formed over one or more of the first interior surface and the second interior surface, the gripping portion being constructed of a second material that is different than the first material. A tightening member can be pivotally secured to a second end of the fixed clamping member and can have a threaded portion. The motion analysis device can include a knob having a threaded interior portion, the threaded interior portion having a diameter corresponding to that of the cylindrical threaded portion. The pivoting clamping member can include an opening having a shape and a size such that the tightening member is engagable therein.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2 illustrates the exemplary motion analysis device of FIG. 1B attached to a golf club shaft;

FIG. 3 illustrates an exemplary tightening member;

DETAILED DESCRIPTION

Figure 1A:
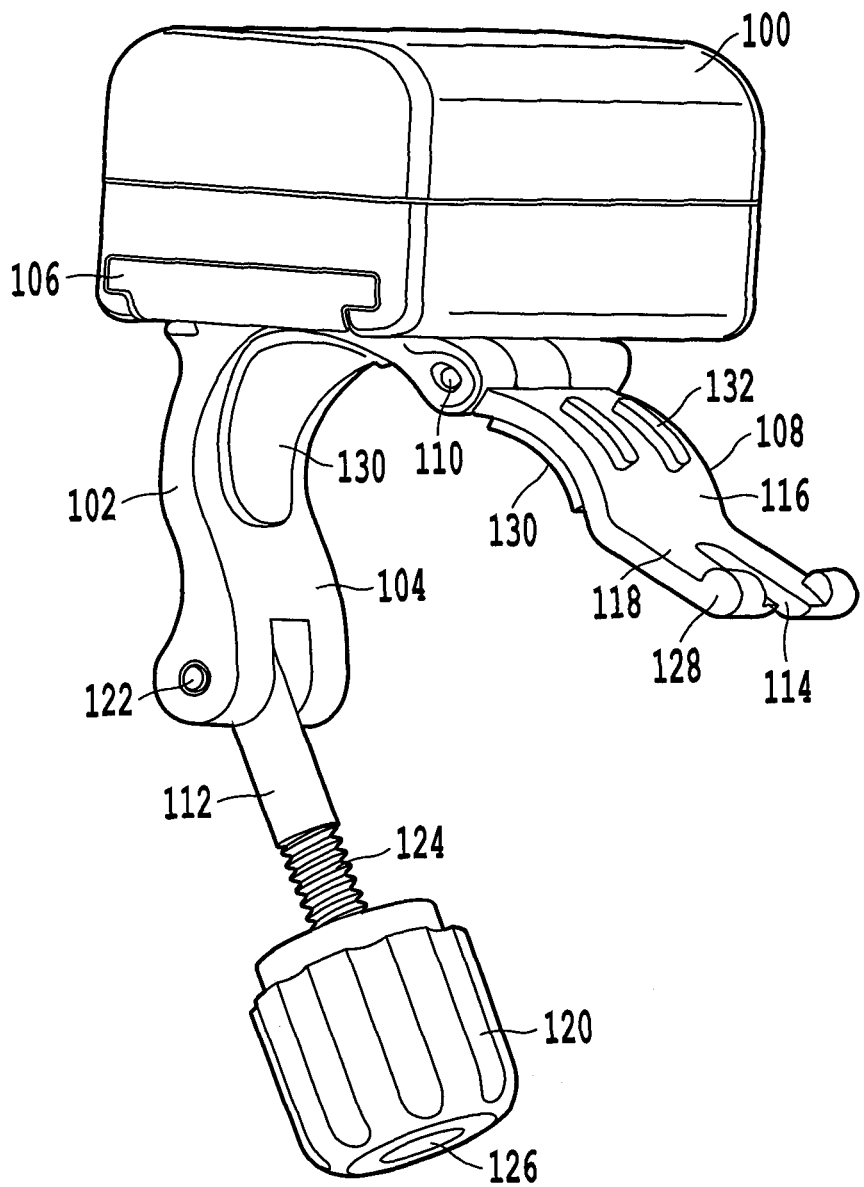
FIG. 1A illustrates an exemplary motion analysis device in an open position.

Referring now to the drawings, wherein like reference numerals designate identical or corresponding parts throughout the several views.

FIG. 1A illustrates an exemplary motion analysis device 10. The motion analysis device 10 may be used to measure motion characteristics, and to perform subsequent motion analysis and motion path reconstruction based on the measured motion. For example, the motion analysis device 10 may affixed to the shaft of a golf club so as to measure and analyze features of a golf swing. For illustration purposes, FIG. 2 provides a non-limiting example of the motion analysis device 10 attached to a golf club shaft 200.

Referring back to FIG. 1A, the motion analysis device 10 of FIG. 1A includes a sensor housing 100. The sensor housing 100 may be an enclosure containing a sensor array that may be used to sense and analyze various aspects of motion. Features related to the sensor array contained within the sensor housing 100 will be further described later paragraphs. It should be noted that while the present disclosure describes the sensor housing 100 as housing motion sensors, this should not be construed as limiting. In particular, the present disclosure may easily be adapted such that other sensors and/or technologies are housed in the sensor housing 100.

The sensor housing 100 should be dimensionally constructed such that as small a footprint as possible is maintained, within the size constraints of the internal sensors. Maintaining the sensor housing at a minimal footprint provides the benefit of decreased weight and a smaller visual distraction when the motion analysis device 10 is used, e.g., on a golf club. Ideally, size priorities for the sensor housing 100 are, in order, a small height (i.e., the distance protruding from the golf club shaft), a narrow width (i.e., the distance corresponding to the thickness of the club shaft), and a short length (i.e., the distance corresponding to the length of the club shaft).

A fixed clamping member 102 may be integrally formed with or affixed to (e.g., by a screw and/or a sliding rail assembly) the sensor housing 100. A first interior surface 104 of the fixed clamping member 102 provides the majority of the surface area used for securing the exemplary motion analysis device 10 to a club shaft; however, the dimensions of the motion analysis device 10 elements may be altered, e.g., such that pivoting clamping member 108 is larger than the fixed clamping member 102.

The example of FIG. 1A shows the fixed clamping member 102 as having a sliding rail 106, which is engaged to the underside of the sensor housing 100 to connect the two elements. While not limiting, this exemplary configuration that includes the sliding rail 106 provides for ease in sensor replacement, e.g., when a sensor malfunctions, when a clamp assembly breaks, and when a single sensor is desired to be quickly transferred between multiple golf clubs that have clamp assemblies attached in advance. While this exemplary configuration provides the foregoing benefits, it should be noted that the fixed clamping member 102 may also be formed integrally with the sensor housing 100, e.g., as a single molded unit.

Due to high material stress and strain resultant from swing a golf club and impact with a golf ball, the fixed clamping member should be constructed of materials having high strength properties. As a non-limiting example, the fixed clamping member 102 may be composed of a nylon-based plastic material, such as Zytel (registered trademark) by Dupont. Polycarbonates may also be used; however, decreased performance in withstanding the shock and vibration of a golf swing may result from using this material. Higher elasticity materials, such as rubber and some metals, are not preferred due to their material strength properties, as well as their inability to firmly secure the motion analysis device 10 to a golf shaft throughout a golf swing without rotation or linear movement on the golf shaft. The latter consideration should be appreciated since any movement of the motion analysis device 10 relative to the golf club during the swing introduces inaccuracies in motion measurements and subsequent motion path reconstruction of the swing.

The motion analysis device 10 may also include a pivoting clamping member 108 pivotally secured to an end of the fixed clamping member 102 by a pin 110. As will be described in detail later, the pivoting clamping member 108, in conjunction with the fixed clamping member 102 and a tightening member 112, can be arranged in a secured position to securely affix the motion analysis device 10 to, e.g., a golf club shaft. The pivoting clamping member 108 may include an opening 114, which should be of a corresponding size and shape to the tightening member 112 such that the tightening member 112 can engage the opening 114 when the motion analysis device 10 is in the secured position. As a non-limiting example, the opening 114 may be formed at an end of the pivoting clamping member 108 opposing the pin 110, such that a portion of the pivoting clamping member 108 is bifurcated by the opening 114. This exemplary configuration provides easy engagement of the tightening member 112 into the opening 114 when placing the motion analysis device 10 in the secured position.

The pivoting clamping member 108 may include a curved portion 116 and a flat portion 118. The curved portion 116 may have a similar curvature to the curvature of the first interior surface 106. The flat portion 118 may provide a surface with which to secure the tightening member 112 via a knob body 120 and a locking edge 128, as will be described later. It should be appreciated that the exemplary configuration of FIG. 1A is not limiting, and the present disclosure may be easily adapted by one of ordinary skill such that other arrangements are formed. For example, the tightening member 112 may be pivotally attached to the pivoting clamping member, and the opening 114 may be located on the fixed clamping member 102.

The pivoting clamping member 108 may be constructed of a material that is different from that of the fixed clamping member 102. It may be desirable for the pivoting clamping member 108 to have a relatively high elasticity, while still maintaining high strength characteristics (i.e. high fracture toughness, tensile strength, and yield strength) to prevent fracture and/or shear failure during a golf swing. Increased elasticity may allow the pivoting clamping member 108 to effectively "pull" the golf club shaft towards a harder (i.e., higher compressive strength) fixed clamping member 102, thereby improving the degree to which the motion analysis device 10 is secured to the club. As a non-limiting example, the pivoting clamping member 108 may be cast aluminum, or a similar metallic material.

The tightening member 112 may be pivotally secured to a second end of the fixed clamping member 102 by a pin 122. The tightening member 112 may be an elongated element having a threaded portion 124. The threaded portion 124 may have a diameter corresponding to a threaded interior portion 126 of the knob body 120. The threaded portion 124 and the threaded interior portion 126 preferably have coarse threading and a tight fit rating when mated (e.g., Class 3A/B thread class), which provides higher friction and consequently improved ability for the motion analysis device 10 to remain secure to the club during swings. Again, because there is a high probability of material failure due the stress resultant from a swing of a golf club, and also because motion of the motion analysis 10 relative to the golf club should be minimized during the swing for maximum sensor measurement reliability, the tightening member 112 should be of high material strength (i.e., high fracture toughness, tensile strength, and yield strength). As a non-limiting example, the tightening member 112 may be comprised of stainless steel.

For illustration purposes, FIG. 3 provides a detailed view of the exemplary tightening member 112. The tightening member 112 may include a hole 300 having a corresponding size to the pin 122 such that the pin 122 can be inserted through the hole 300 to secure the tightening member 112 to the fixed clamping member 102 via the pin 122. As shown in FIG. 3, the threaded portion 124 may have a length that is less than the length of the tightening member 112; however, this is not limiting. Further, while a screw-type tightening member, such as that in FIG. 3, provides high performance in terms of tightness adjustment and strength, it should be appreciated that FIG. 3 is merely one exemplary embodiment of a tightening member, and other forms of tightening members may be substituted to achieve similar results. For example, variances in shapes, sizes, threading, screw lead angle, length, and material may be utilized for other screw-type tightening members. Alternatively, racheting-type tightening members may be utilized. In the case of using racheting mechanisms, a pivoting clamping member can be connected to a fixed clamping member via a racheting tightening member, and a ratchet device can be used in lieu of a screw and knob to tighten the assembly.

Referring back to FIG. 1A, the motion analysis device 10 includes a gripping element 130 formed over the first interior surface 106 and a second interior surface (not shown) of the pivoting clamping member 108. The gripping element 130 provides reduced friction with the club shaft, dampens vibrations caused during impact with a golf ball, and reduces the likelihood that the motion device 10 will rotate and/or change axial positions on the club shaft during a swing. As a non-limiting example, the gripping element 130 may be comprised of rubber. Specifically, the gripping element 130 may be comprised of an isoprene rubber material. However, it should be appreciated that the gripping element 130 is not limited to these materials. The gripping element 130 is preferably of a material of high durometer rating, such that the gripping element 130 can absorb compressive forces while resisting permanent deformation. A high durometer rating also provides the benefit of reducing the necessary thickness of the gripping element 130, thereby reducing the necessary overall size of the motion analysis device 10 clamping assembly.

Because the gripping material 130 contacts the club shaft directly when the motion analysis device 10 is in the secured position, the gripping element 130 preferably has a large surface area such that its above-discussed benefits are more fully realized. However, any or all portions of the mobile analysis device 10 clamping assembly may be covered by the gripping material 130. The surface of the gripping element 130 should preferably be sufficiently sticky so as to firmly grip a club shaft, which is typically constructed from graphite or steel, but should not be overly sticky because of the potential for the gripping element 130 to form to the club shaft and cause deformation.

To secure the gripping material 130 in place, a stability member 132 may protrude from one side of the gripping material 130, and the stability member 132 may be inserted into a hole formed in the fixed clamping member 102 and/or the pivoting clamping member 108. Accordingly, the stability member 132 may have a shape and size corresponding to the hole in which it is inserted. In addition to the stability member 132, an adhesive layer (not shown) may be sandwiched between the gripping material 130 and the surface on which it is formed. The adhesive should be of high tension and/or shear strength to perform in a golf setting.

Figure 1B:
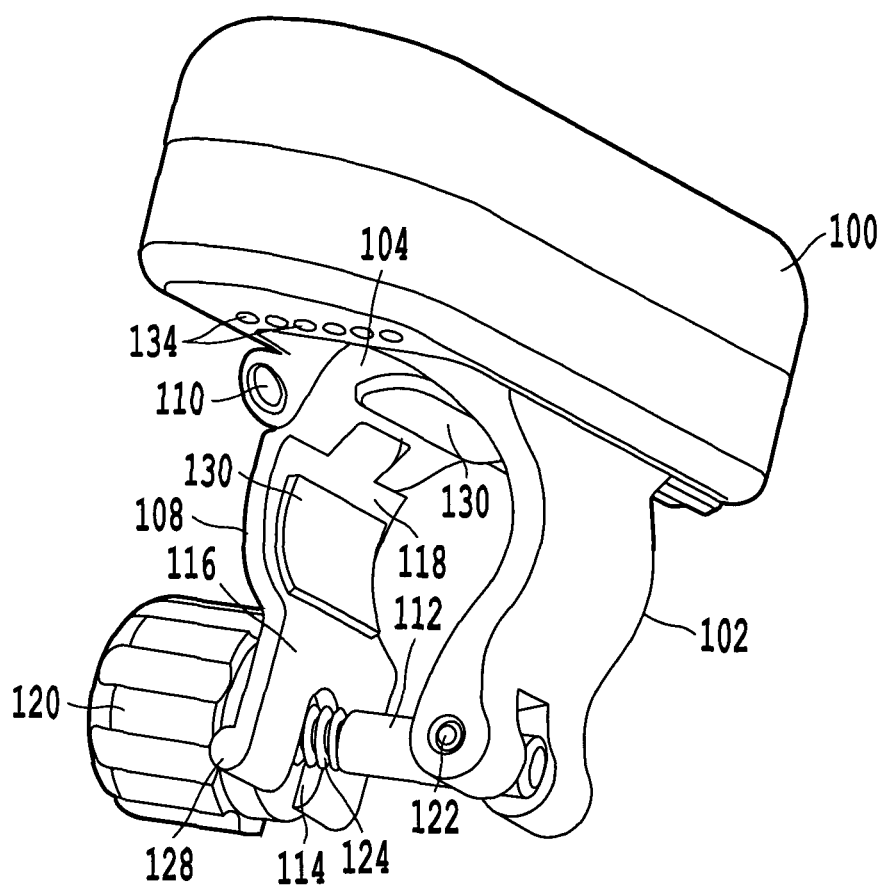
FIG. 1B illustrates the exemplary motion analysis device of FIG. 1A in a secured position.

Next, FIG. 1B illustrates the motion analysis device 10 of FIG. 1A in the secured position. In the exemplary arrangement of FIG. 1B, the secured position corresponds to the tightening member 112 being engaged with the opening 114 with the knob body 120 at a farther distance from the fixed clamping member 102 than the flat portion 118. This arrangement allows the knob body 120 to be rotated on the threaded portion 124 such that the fixed clamping member 102 and the pivoting clamping member 108 are tightened around the shaft of the golf club. The knob body 120 may be held in place by a locking edge 128 formed on the pivoting clamping member 108. The locking edge 128 protrudes at a height which precludes the knob body 120 from moving past the locking edge 128 under the force of a golf swing and/or impact with a ball, thereby preventing the tightening member 112 from disengaging with the opening 114.

The threaded interior portion 126 may run through the entirety of the knob body 120, similar to commonly used nut fasteners. This maximizes the axial distance at which the knob body 120 may be moved on the tightening member 112, thereby improving tightness of fit for the motion analysis device 10 around the golf club shaft. Additionally, an important design consideration for a tightening assembly is that the motion analysis device 10 be capable of accommodating variances in club shaft size due to differences in club classifications (i.e., putters, drivers, irons, etc.) and club manufacturers. This design consideration can be more easily met by having the threaded interior portion 126 running through the knob body 120 because more tightening can be achieved without unnecessarily increasing the size of the knob body 120. Further, the threaded portion 124 of the tightening member 112 may have a length extending in the longitudinal direction of the tightening member 112, where the length of the threaded portion 124 may be equal to the length of the tightening member 112. A greater length of the threaded portion 124 allows the knob body 120 increased range with which to be tightened.

When in the secured position, the motion analysis device 10's clamping assembly (i.e., the fixed clamping member 102, the tightening member 112, and the pivoting clamping member 108) form an internal diameter that is roughly circular, corresponding to the size and shape of a typical golf club shaft. It should be noted that the internal diameter this internal diameter may vary within the clamping assembly. For example, the internal diameter may decrease corresponding to the tapering of a golf shaft. The "tapering" internal diameter may be achieved, e.g., by varying the thickness of the gripping member 130, by varying the shape and size of the fixed clamping member, and by varying the shape and size of the pivoting clamping member 118. A tapering internal diameter in the clamping assembly improves the degree to which the motion analysis device 10 can be held in place during a golf swing by ensuring compressing force is sufficiently applied to the golf shaft. It should also be noted that the present disclosure may be easily adapted such that internal diameter shapes other than circles are used, which would accommodate other shaft designs and/or other non-golf applications.

As visible from the perspective of FIG. 1B, the sensor housing 100 may include an electrical contact 134. The electrical contact 134 may include a plurality of individual contacts that form an electrical connection with, e.g., elements associated with the sensor unit housed in the sensor housing 100. The electrical contact 134 may be recessed from the surface of the sensor housing 100 such that the shaft of the golf club does not physically contact the electrical contact 134, thereby preventing shorts between individual contacts. As a non-limiting example, the electrical contact 134 may, e.g., provide an interface for performing battery charges, software upgrades, and control signal transmission for the motion analysis device 10. The electrical contact 134 may also receive a signal for powering down the sensor unit housed in the sensor housing 100. The electrical contact 134 may be formed as a "hot shoe" type connection, which provides the benefit of improved water-tightness. While not limiting, the exemplary motion analysis device 10 includes no buttons or other programming ports (e.g., Universal Serial Bus connection), which further improves water-tightness.

Figure 1C:
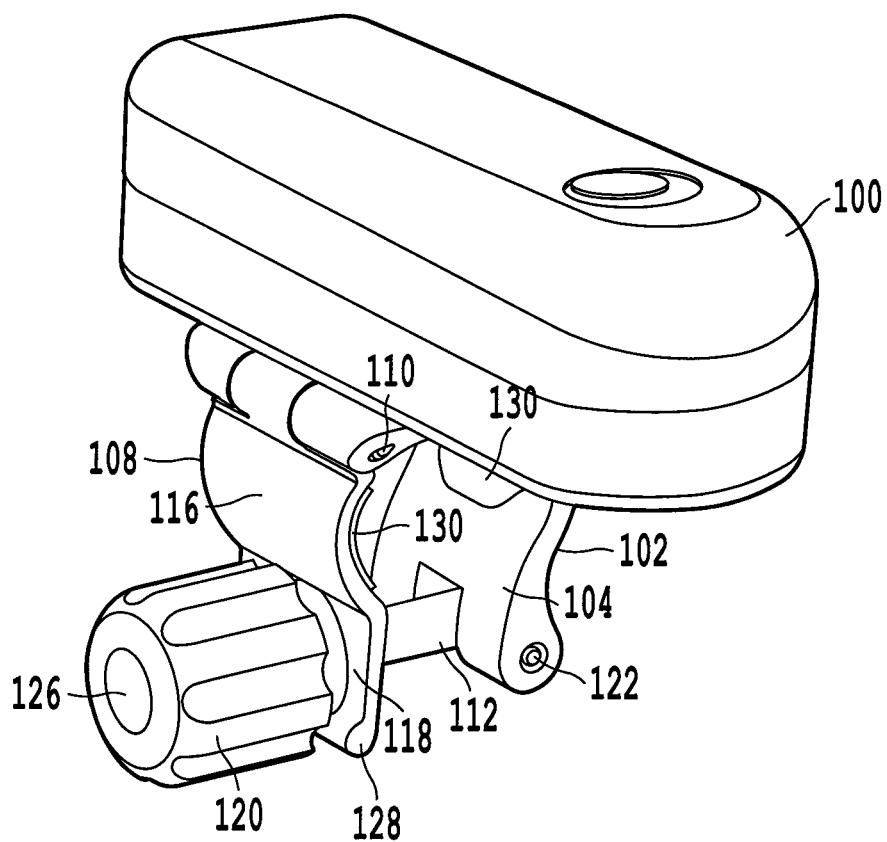
FIG. 1C illustrates the exemplary motion analysis device of FIG. 1B from an alternate perspective.

For illustration purposes, FIG. 1C provides an alternative perspective for the motion analysis 10 in the secured position.

Figure 4:
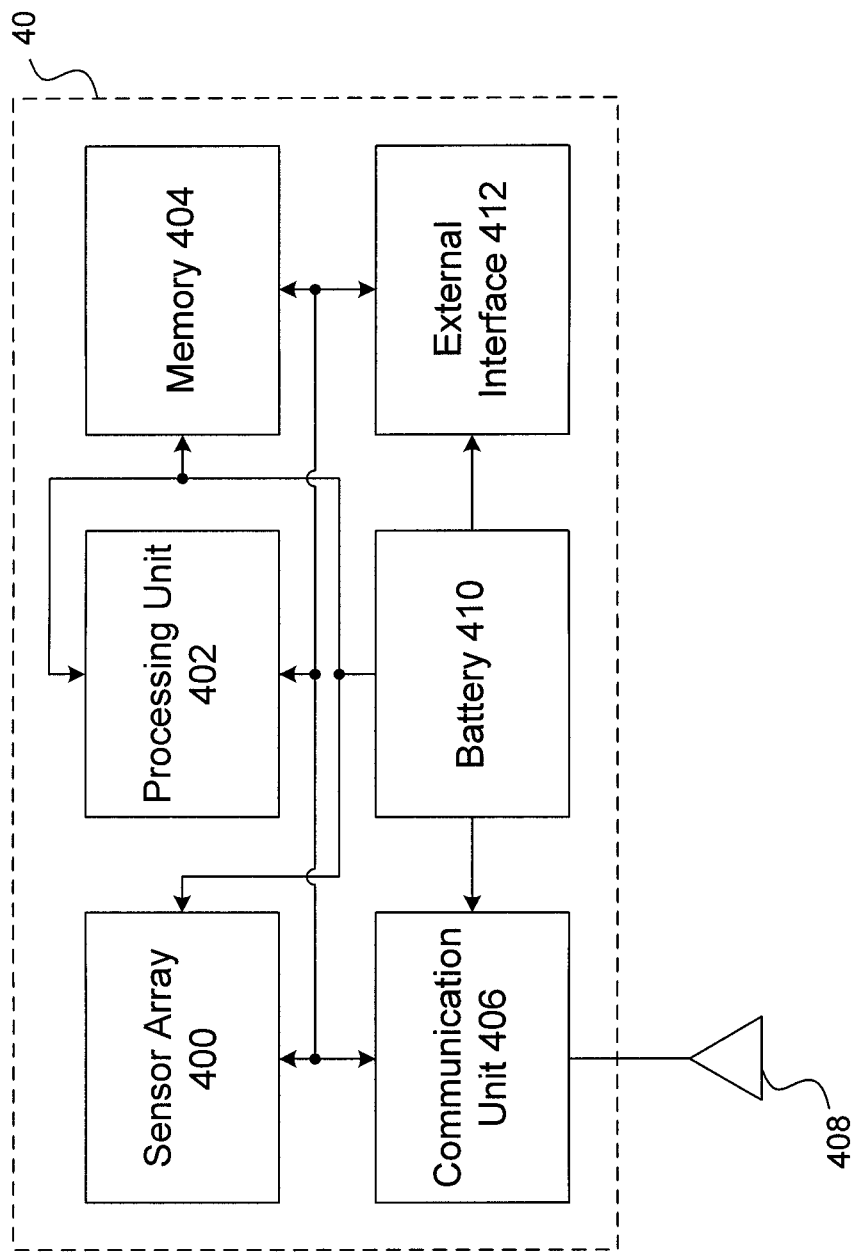
FIG. 4 illustrates an exemplary schematic block diagram for a sensor unit.

Next, FIG. 4 illustrates an exemplary sensor unit 40. The sensor unit 40 may be housed in the sensor housing 100 of the above-described motion analysis device 10. The exemplary sensor unit 40 includes a sensor array 400, a processing unit 402, a memory 404, a communication unit 406, an antenna 408, a battery 410, and an external interface 412.

The sensor array 400 may include one or more sensors for providing inertial measurement data for use in, e.g., motion path reconstruction to analyze a golf swing. For example, the sensor array 400 may include one or more of an accelerometer, a gyroscope, a piezoelectronic sensor, and a magnetometer. The sensor elements in the sensor array 400 may provide measurement data in at least three axial directions (e.g., the x-y-z axis). The accelerometer may be, e.g., the ADXL345 from Analog Devices. The gyroscope may be, e.g., the ITG-3200 from Invensense. The magnetometer may be, e.g., the HMC5883L from Honeywell. The sensors of the sensor array 400 may be arranged on a printed circuit board (PCB). When a gyroscope is included in the sensor array 400, the gyroscope should preferably be mounted within the sensor housing 100 with its internal y-axis aligned in parallel or perpendicular to an axis formed by a centerline of the golf club shaft to which the device is mounted. When an accelerometer is included in the sensor array 400, the accelerometer should preferably be mounted within the sensor housing 100 such that it is offset 45-degrees from an axis parallel or perpendicular to a centerline of the golf club shaft to which the device is mounted. This arrangement of gyroscope and accelerometer within the sensor housing 100 provides the benefit of distributing forces associated with a golf swing across multiple axes, thereby reducing the required measurement range of the sensors.

The resulting measurement data generated by the sensor array 400 may be transmitted via the communication unit 406 and the antenna 408 to other external devices, such as a mobile phone terminal device. The communication unit 406 may receive and transmit data by known protocols over wired or wireless connections, such as cellular, Bluetooth, Wi-Fi, Ethernet, radio, and the like. The communication unit 406 may be configured such that the measurement data generated by the sensor array 400 is transmitted and received in response to a movement of the motion analysis device 10.

The sensor unit 40 is powered by the battery 410. The battery 410 may be a rechargeable battery with at least a charging capacity to continuously power the sensor unit 40 for the duration of a typical 18-hole round of golf (usually at least 4 hours). The battery 410 may be a lithium polymer type device, or other suitable battery technology. Power circuitry associated with the battery 410 may be configured such that the sensor unit 40 is turned on when a movement of the sensor unit 40 is detected by the sensor array 400. Further, the power circuitry may be configured to perform a power down of the sensor unit 40 when a predetermined time period elapses with no detected motion above a predetermined threshold, or when a power control signal is received.

The memory 404 may be a memory array comprised of volatile and/or non-volatile memory units. Among other things, the memory 404 may be configured to store the measurement data generated by the sensor array 400 and executable instructions for the processing unit 402.

The processing unit 402 may be of a variety of known processor types that would be recognized by one of ordinary skill in the art, such as the Bluecore 5 Multimedia External from Cambridge Silicon Radio. Alternatively, the processing unit 402 may be implemented on an FPGA, ASIC, PLD, or using discrete logic circuits, as one of ordinary skill in the art would recognize. Further, the processing unit 402 may be implemented as multiple processors cooperatively working in parallel to perform the instructions of the inventive processes described above. Among other things, the processing unit 402 may be responsible for configuring the sensor array 400, collecting data, detecting swings based on measurement data, saving swing data, handling connection logic, communicating collected data with an external device, and detecting periods of inactivity and entering low power modes appropriately.

The external interface 412 provides an additional interface for transmitting and receiving signals to/from an external source. As a non-limiting example, the external interface 412 may be configured such that it is electrically connected to one or more of the individual contacts in the electrical contact 134 shown in FIG. 1B. In this case, the external interface 412 provides a path for, e.g., charging, performing software updates, and sending/receiving control signals on the motion analysis device 10.

Figure 5:
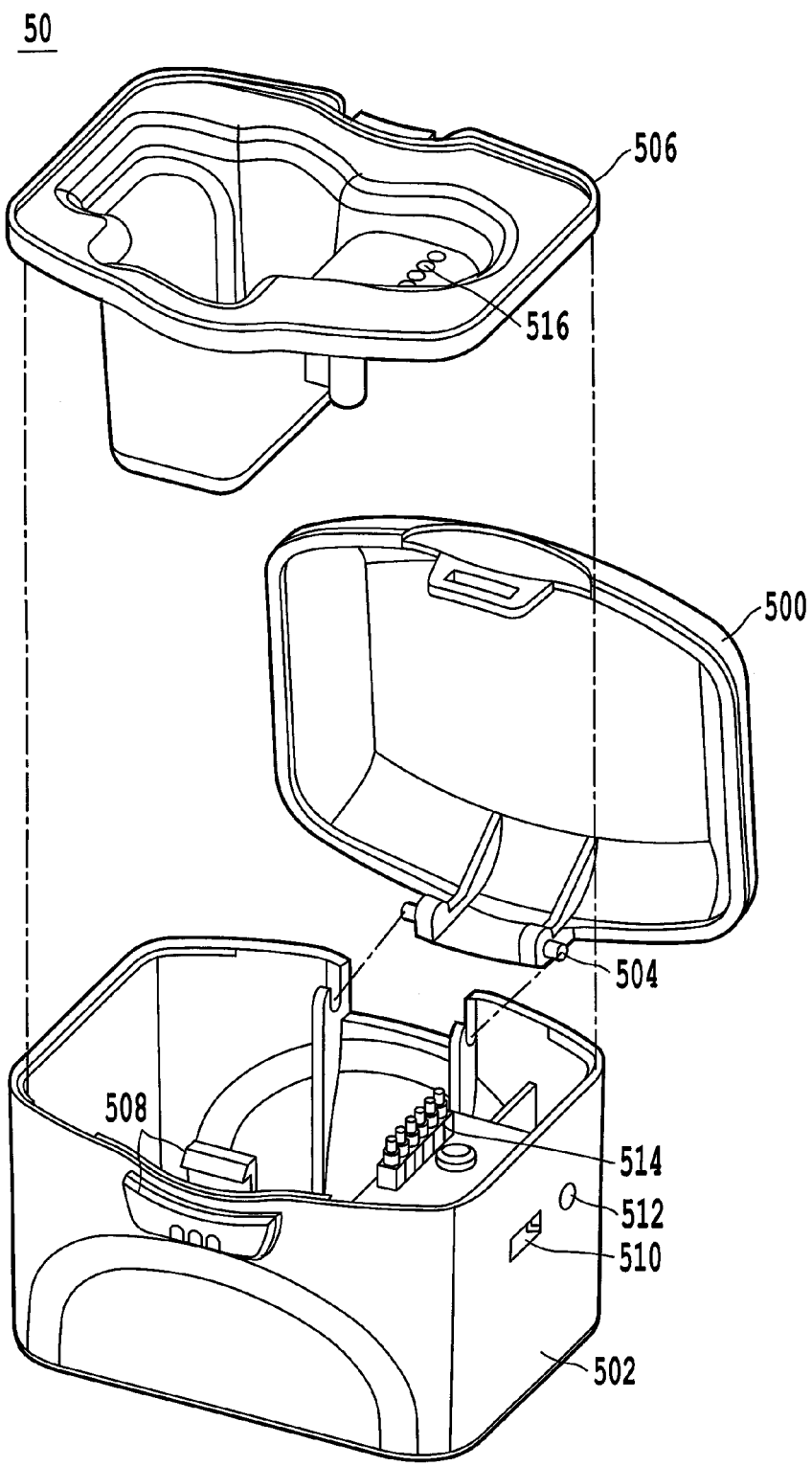
FIG. 5 illustrates an exploded view of an exemplary storage case.
Figure 6:
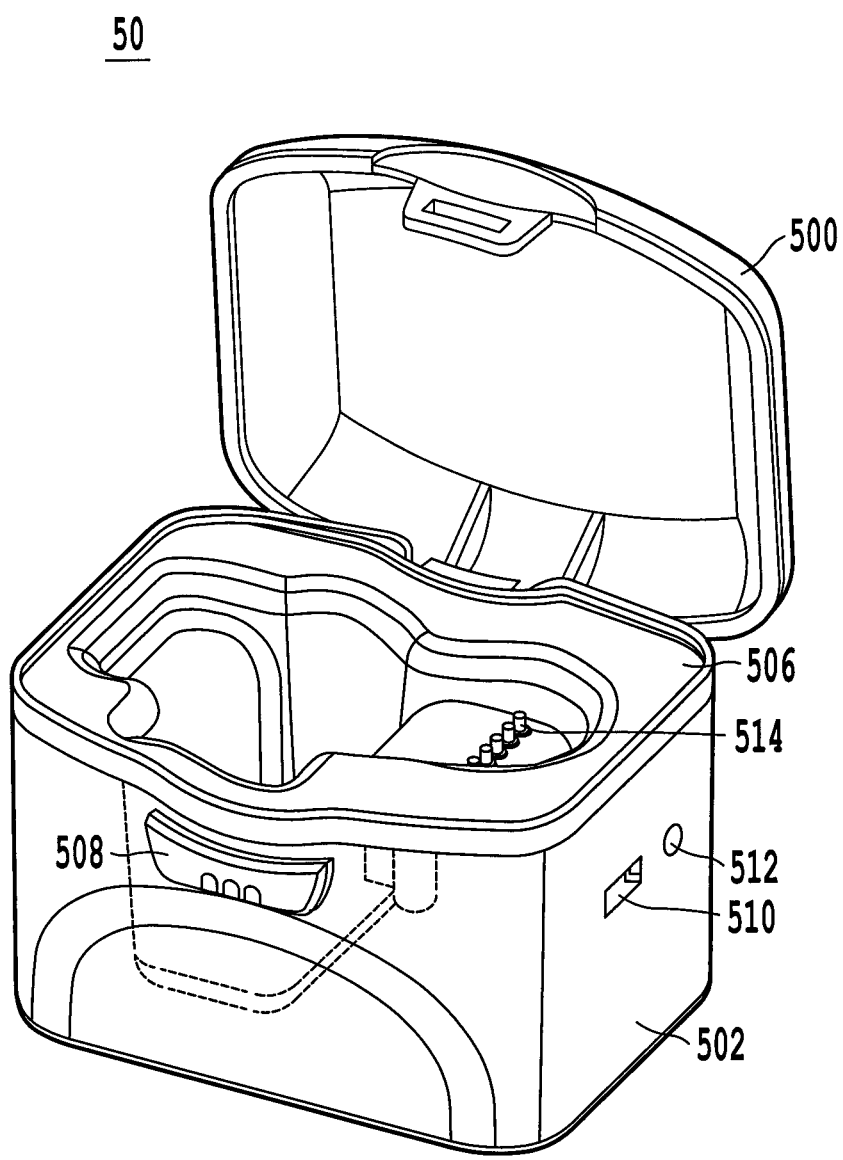
FIG. 6 illustrates an assembled view of the storage case shown in FIG. 5.

Next, FIGS. 5 and 6 respectively illustrate exploded and assembled views of a storage case 50. The storage case 50 may be used a storage/protection mechanism for the motion analysis device 10. Additionally, the storage case 50 may include features that provide an interface for charging and communicating with the motion analysis device 10.

Referring to FIG. 5, the storage case 50 may include a top portion 500 and a bottom portion 502, which are connected by a hinge 504. The top portion 500 may be secured to the bottom portion by a clip assembly 508. A resting piece 506 may be integrally formed or attached within the bottom portion 502. The resting piece 506 includes a hollow region with a shape and size corresponding to the motion analysis device 10. Openings 516 may be formed in the resting piece 506 such that pin contacts 514 may be accessed. The bottom portion may include an interface port 510, which may be connected to the pin contacts 514. The interface port 510 may be of any of various communication standards known in the art, such as a Universal Serial Bus (USB) communication port. The pin contacts 514 may correspond, e.g., to the electrical contact 134 of the motion analysis device 10. That is, when the motion analysis device 10 is in a stored state within the case 50, the pin contacts 514 may be configured to electrically connect with the electrical contact 134, thereby forming a signal flow path between the interface port 510 and the sensor unit 40. This signal flow path may be used for charging, performing software updates, and control signal transmission with the motion analysis device 10. The motion analysis device 10 may also be configured to power down when in the stored state, and to power on when removed from the case 50. An indicator light 512 may be included on the case 50 to indicate various states of the motion analysis device 10 and the case 50, such as a charging completion or a communication status.

Figure 7:
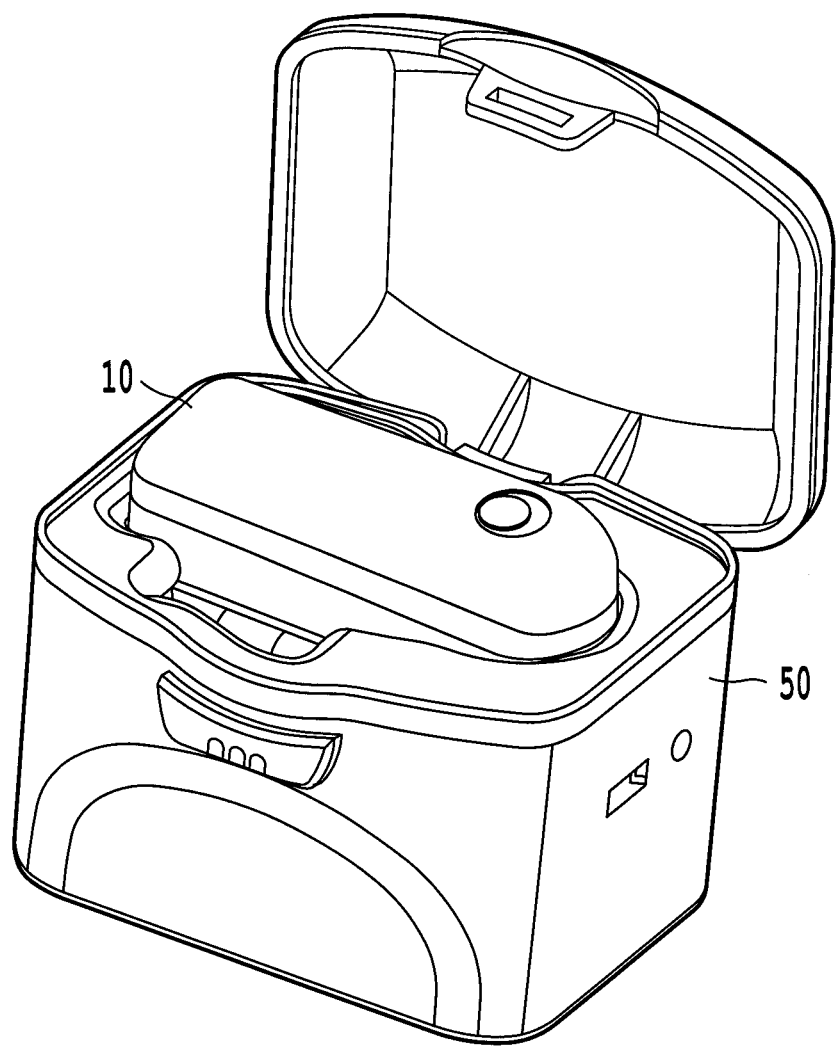
FIG. 7 illustrates the exemplary motion analysis device of FIG. 1B in a stored state within the storage case of FIG. 6.

For illustration purposes, FIG. 7 shows the motion analysis device 10 of FIGS. 1A-C in a stored state within the case 50. As previously discussed, the exemplary arrangement of FIG. 7 may serve to store and protect the motion analysis device 10 when not in use. Additionally, the stored state shown in FIG. 7 results in the pin contacts 514 connecting with the electrical contact 134, which provides a transmission path for charging and data exchange. Additionally, when in the stored state of FIG. 7, the motion analysis device 10 may be configured to enter a low power state where power consumption of the device is reduced or secured.

Obviously, numerous modifications and variations of the present disclosure are possible in light of the above teachings. It is therefore to be understood that within the scope of the appended claims, the present disclosure may be practiced otherwise than as specifically described herein. For example, advantageous results may be achieved if steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/ or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The invention claimed is:

1. A motion analysis device comprising:
   a fixed clamping member of a first length having a first interior surface and an exterior surface, the fixed clamping member including a first material;
   a sensor formed on the exterior surface of the fixed clamping member, the sensor configured to detect a motion of the motion analysis device;
   a pivoting clamping member pivotally secured to a first end of the fixed clamping member, the pivoting clamping member being a second length that is different from the first length and having a second interior surface that opposes the first interior surface of the fixed clamping member when the pivoting clamping member is in a secured position;
   a gripping element formed over one or more of the first interior surface and the second interior surface, the gripping element including a second material that is different than the first material;
   a tightening member pivotally secured to a second end of the fixed clamping member and having a cylindrical threaded portion; and
   a knob formed on the tightening member, the knob having a threaded interior portion, the threaded interior portion having a diameter corresponding to that of the cylindrical threaded portion, wherein
   the pivoting clamping member includes an opening having a shape and a size such that the tightening member is engagable therein,
   the pivoting clamping member further includes a hole,
   the gripping element includes a stability member that protrudes through the hole to the exterior surface of the pivoting clamping member, and
   the hole has a shape and size corresponding to the stability member, and
   when the pivoting clamping member is in the secured position, the fixed clamping member and the pivoting clamping member are both in contact with the sensor and the tightening member.

2. The motion analysis device of claim 1, wherein the sensor includes an accelerometer.

3. The motion analysis device of claim 2, wherein a longitudinal axis of the accelerometer is offset from an axis that is parallel to the first interior surface of the fixed clamping member.

4. The motion analysis device of claim 1, wherein the sensor includes a gyroscope.

5. The motion analysis device of claim 1, wherein the sensor is detachable from the fixed clamping member, and the sensor includes one or more electrical contacts connectable to an external interface.

6. The motion analysis device of claim 5, wherein the sensor is configured to receive, via the electrical contacts, a signal for securing power to the sensor.

7. The motion analysis device of claim 5, wherein the sensor includes a battery that is electrically connected to the electrical contacts.

8. The motion analysis device of claim 5, wherein the electrical contacts are recessed from an external surface of the sensor.

9. A clamping device comprising:
   a fixed clamping member of a first length having a first interior surface and including a first material;
   a pivoting clamping member pivotally secured to a first end of the fixed clamping member, the pivoting clamping member being a second length that is different from the first length and having a second interior surface that opposes the first interior surface of the fixed clamping member when the pivoting clamping member is in a secured position;
   a gripping element formed over one or more of the first interior surface and the second interior surface, the gripping element including a second material that is different than the first material;
   a tightening member pivotally secured to a second end of the fixed clamping member and having a cylindrical threaded portion; and
   a knob formed on the tightening member, the knob having a threaded interior portion, the threaded interior portion having a diameter corresponding to that of the cylindrical threaded portion, wherein
   the pivoting clamping member includes an opening having a shape and a size such that the tightening member is engagable therein,
   the pivoting clamping member further includes a hole,
   the gripping element includes a stability member that protrudes through the hole to the exterior surface of the pivoting clamping member, and
   the hole has a shape and size corresponding to the stability member.

10. The clamping device of claim 9, wherein
    a first end of the pivoting clamping member is pivotally secured to the first end of the fixed clamping member,
    the opening of the pivoting clamping member is formed on a second end of the pivoting clamping member such that a portion of the pivoting clamping member is bifurcated by the opening.

11. The clamping device of claim 9, wherein the first material comprises a nylon resin.

12. The clamping device of claim 9, wherein the pivoting clamping member includes a third material that is different than the first material and the second material.

13. The clamping device of claim 12, wherein the third material is a metallic alloy.

14. The clamping device of claim 9, wherein when the pivoting clamping member is in the secured position, the tightening member is engaged with the opening and an exterior surface of the pivoting clamping member is between an edge of the knob and the interior surface of the pivoting clamping member.

15. The clamping device of claim 9, wherein a first curvature of the first interior surface corresponds to a shaft of a golf club.

16. The clamping device of claim 15, wherein
    the second interior surface includes a curved portion, and
    the curved portion of the second interior surface has a curvature corresponding to the first curvature of the first interior surface.

17. The clamping device of claim 9, wherein a body of the knob forms a ring centered around the threaded interior portion.

18. The clamping device of claim 9, wherein
the fixed clamping member has a first width formed between two sides of the fixed clamping member which are adjacent to the first end, and
the first material formed on the first interior surface has a thickness that increases proportionally to the first width.

19. The clamping device of claim 9, wherein
the pivoting clamping member has a second width formed between two sides of the pivoting clamping member which are adjacent to the first end of the fixed clamping member, and
the second material formed on the one or more of the first interior surface and the second interior surface has a thickness that increases proportionally to the second width.

20. The clamping device of claim 9, wherein the second material comprises a rubber.

\* \* \* \* \*